US011632754B2

(12) United States Patent
Rico Alvarino et al.

(10) Patent No.: US 11,632,754 B2
(45) Date of Patent: Apr. 18, 2023

(54) SUPPORT OF MULTIPLE SRS IN THE SAME SUBFRAME

(71) Applicant: QUALCOMM Incorporated, San Diego, CA (US)

(72) Inventors: Alberto Rico Alvarino, San Diego, CA (US); Le Liu, Fremont, CA (US); Peter Gaal, San Diego, CA (US); Supratik Bhattacharjee, San Diego, CA (US); Qiang Shen, San Diego, CA (US); Rebecca Wen-Ling Yuan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/166,289

(22) Filed: Feb. 3, 2021

(65) Prior Publication Data
US 2021/0250943 A1 Aug. 12, 2021

Related U.S. Application Data

(60) Provisional application No. 62/971,193, filed on Feb. 6, 2020.

(51) Int. Cl.
H04J 3/00 (2006.01)
H04W 72/0446 (2023.01)
H04L 5/00 (2006.01)

(52) U.S. Cl.
CPC ....... H04W 72/0446 (2013.01); H04L 5/0048 (2013.01)

(58) Field of Classification Search
CPC ............. H04W 72/0446; H04W 52/08; H04W 72/1278; H04L 5/0045; H04L 5/0023; H04L 5/0012
See application file for complete search history.

(56) References Cited

U.S. PATENT DOCUMENTS

| 11,284,246 | B2* | 3/2022 | Huang | H04W 8/24 |
| 2013/0201941 | A1* | 8/2013 | Glasson | H04W 72/1278 370/329 |
| 2017/0279580 | A1* | 9/2017 | Chen | H04W 72/042 |
| 2019/0159080 | A1* | 5/2019 | Zhang | H04L 25/02 |
| 2020/0162133 | A1* | 5/2020 | Harrison | H04B 7/0456 |
| 2020/0212972 | A1* | 7/2020 | Zhang | H04B 7/0456 |

FOREIGN PATENT DOCUMENTS

WO 2018231141 A1 12/2018

OTHER PUBLICATIONS

International Search Report and Written Opinion—PCT/US2021/016632—ISA/EPO—dated Jun. 7, 2021.

* cited by examiner

Primary Examiner — Abdelnabi O Musa
(74) Attorney, Agent, or Firm — Patterson & Sheridan, L.L.P/Qualcomm Incorporated

(57) ABSTRACT

Certain aspects of the present disclosure provide techniques for indicating capability of a user equipment (UE) to support multiple sounding reference signals (SRSs) with a single subframe, with at least one of frequency hopping, different bandwidths, or antenna switching for the multiple SRSs in the same subframe.

32 Claims, 13 Drawing Sheets

SUPPORT OF MULTIPLE SRS IN THE SAME SUBFRAME

CROSS-REFERENCE TO RELATED APPLICATION

This application claims benefit of and priority to U.S. Provisional Patent Application No. 62/971,193, filed Feb. 6, 2020, which is hereby incorporated by reference in its entirety.

FIELD OF THE DISCLOSURE

Aspects of the present disclosure relate to wireless communications, and more particularly, to techniques for indicating capability of a user equipment (UE) to support multiple sounding reference signals (SRSs) with a single subframe.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station (BS) or distributed unit may communicate with a set of UEs on downlink (DL) channels (e.g., for transmissions from a base station or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a DL and on an UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable communications between a base station (BS) and a user equipment (UE) in a wireless network.

Certain aspects of the subject matter described in this disclosure can be implemented in a method for wireless communications by a UE. The method generally includes reporting, to a network entity, capability information indicating a capability of the UE to support multiple sounding reference signals (SRSs) in a same subframe, wherein the capability information includes one or more parameters indicating capability of the UE to support at least one of frequency hopping, different bandwidths, or antenna switching for the multiple SRSs in the same subframe and transmitting the SRSs in accordance with the capability information.

Certain aspects of the subject matter described in this disclosure can be implemented in a method for wireless communications by a network entity. The method generally includes receiving, from a UE, capability information indicating a capability of the UE to support multiple SRSs in a same subframe, wherein the capability information includes one or more parameters indicating capability of the UE to support at least one of frequency hopping, different bandwidths, or antenna switching for the multiple SRSs in the same subframe and configuring the UE for transmitting the SRSs in accordance with the capability information.

Certain aspects of the subject matter described in this disclosure can be implemented in an apparatus for wireless communications by a UE. The apparatus generally includes means for reporting, to a network entity, capability information indicating a capability of the UE to support multiple SRSs in a same subframe, wherein the capability information includes one or more parameters indicating capability of the UE to support at least one of frequency hopping, different bandwidths, or antenna switching for the multiple SRSs in the same subframe; and means for transmitting the SRSs in accordance with the capability information.

Certain aspects of the subject matter described in this disclosure can be implemented in an apparatus for wireless communications by a network entity. The apparatus generally includes means for receiving, from a UE, capability information indicating a capability of the UE to support multiple SRSs in a same subframe, wherein the capability information includes one or more parameters indicating capability of the UE to support at least one of frequency hopping, different bandwidths, or antenna switching for the multiple SRSs in the same subframe; and means for configuring the UE for transmitting the SRSs in accordance with the capability information.

Certain aspects of the subject matter described in this disclosure can be implemented in an apparatus for wireless communications by a UE. The apparatus generally includes at least one processor and a memory configured to report, to a network entity, capability information indicating a capability of the UE to support multiple SRSs in a same subframe, wherein the capability information includes one or more parameters indicating capability of the UE to support at least one of frequency hopping, different bandwidths, or antenna switching for the multiple SRSs in the same subframe; and transmit the SRSs in accordance with the capability information.

Certain aspects of the subject matter described in this disclosure can be implemented in an apparatus for wireless communications by a network entity. The apparatus generally includes at least one processor and a memory configured to receive, from a UE, capability information indicating a capability of the UE to support multiple SRSs in a same subframe, wherein the capability information includes one or more parameters indicating capability of the UE to support at least one of frequency hopping, different bandwidths, or antenna switching for the multiple SRSs in the same subframe; and configure the UE for transmitting the SRSs in accordance with the capability information.

Certain aspects of the subject matter described in this disclosure can be implemented in a computer readable medium storing computer executable code thereon for wireless communication by a UE. The computer readable medium may include code for reporting, to a network entity, capability information indicating a capability of the UE to support multiple SRSs in a same subframe, wherein the capability information includes one or more parameters indicating capability of the UE to support at least one of frequency hopping, different bandwidths, or antenna switching for the multiple SRSs in the same subframe; and code for transmitting the SRSs in accordance with the capability information.

Certain aspects of the subject matter described in this disclosure can be implemented in a computer readable medium storing computer executable code thereon for wireless communication by a network entity. The computer readable medium may include code for receiving, from a UE, capability information indicating a capability of the UE to support multiple SRSs in a same subframe, wherein the capability information includes one or more parameters indicating capability of the UE to support at least one of frequency hopping, different bandwidths, or antenna switching for the multiple SRSs in the same subframe; and code for configuring the UE for transmitting the SRSs in accordance with the capability information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
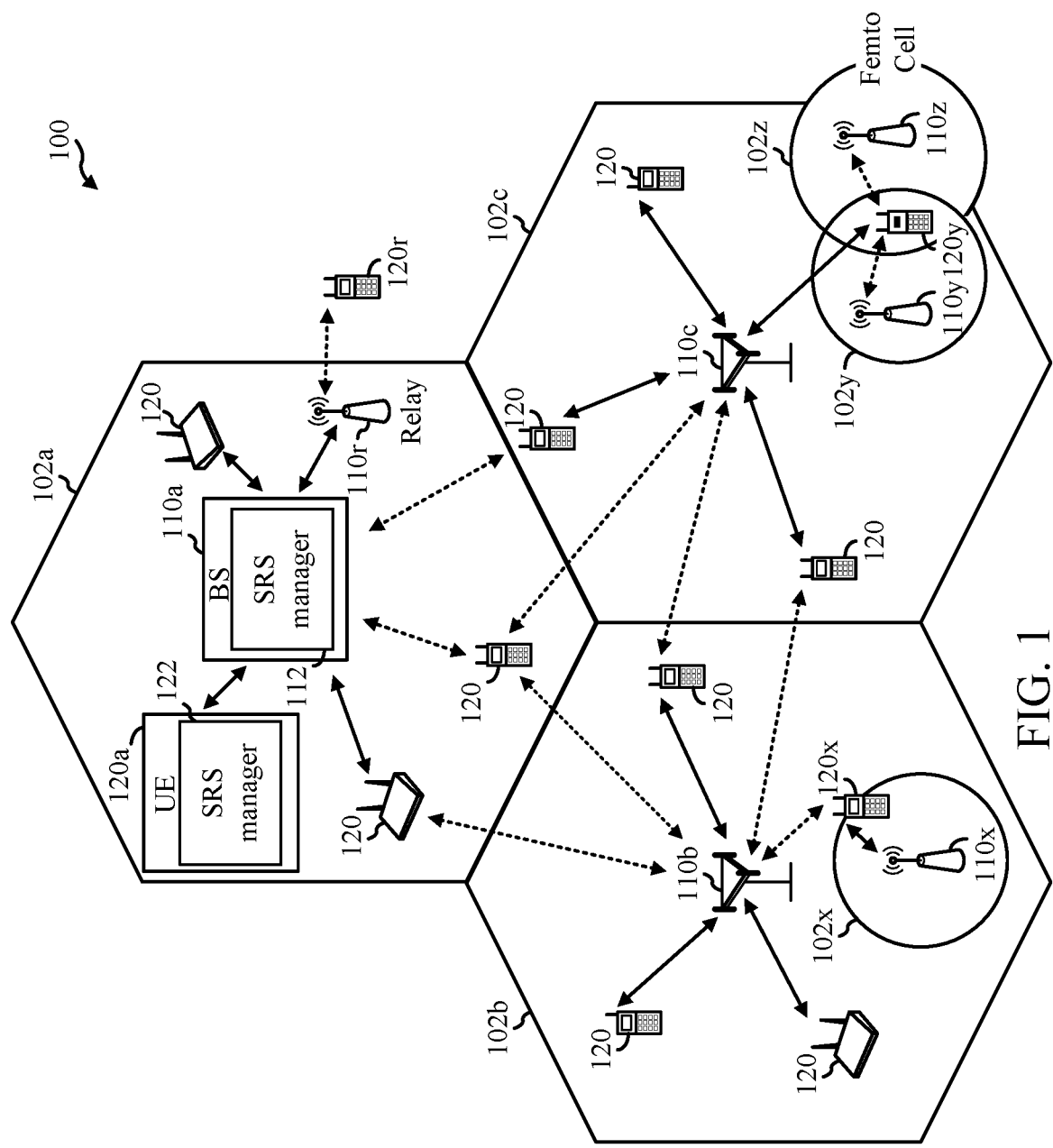
FIG. 1 is a block diagram conceptually illustrating an example telecommunications system, in accordance with certain aspects of the present disclosure.
Figure 1:
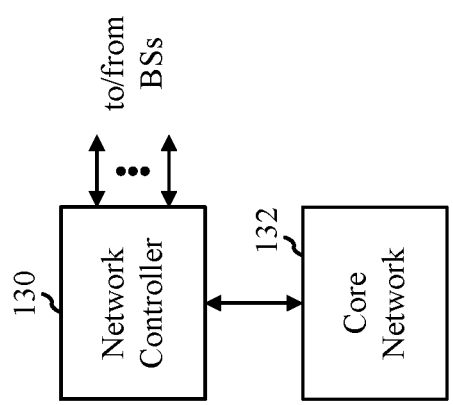

Aspects of the present disclosure relate to wireless communications, and more particularly, to techniques for indicating capability of a user equipment (UE) to support multiple sounding reference signals (SRSs) with a single subframe, with at least one of frequency hopping, different bandwidths, or antenna switching for the multiple SRSs in the same subframe.

The following description provides examples of supporting multiple SRSs with a same subframe, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless communication technologies, such as long term evolution (LTE), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as new radio (NR) (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of the UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, the wireless communication network 100 may include one or more base stations (BSs) 110 and/or one or more user equipments (UEs) 120a-y configured for supporting multiple sounding reference signals (SRSs) with a same subframe. As shown in FIG. 1, a UE 120a includes a SRS manager 122 that may be configured to report their capability information to support multiple SRS transmissions in a single subframe in accordance with operations 900 of FIG. 9. A BS 110a includes a SRS manager 112 that may be configured to perform operations 1000 of FIG. 10 to configure UEs 120 for the SRS transmissions, based on their reported capability information.

The wireless communication network 100 may be a new radio (NR) system (e.g., a 5$^{th}$ generation (5G) NR network). As shown in FIG. 1, the wireless communication network 100 may be in communication with a core network 132. The core network 132 may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS 110. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having an association with the femto cell (e.g., UEs 120 in a Closed Subscriber Group (CSG), UEs 120 for users in the home, etc.). ABS 110 for a macro cell may be referred to as a macro BS. A BS for a pico cell may be referred to as a pico BS. ABS 110 for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple (e.g., three) cells.

The wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE 120 may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs 120 may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on a downlink (DL) and single-carrier frequency division multiplexing (SC-FDM) on an uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. Multiple input multiple output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between a UE 120 and a serving BS 110, which is a BS 110 designated to serve the UE 120 on the DL and/or the UL. A finely dashed line with double arrows indicates interfering transmissions between a UE 120 and a BS 110.

Figure 2:
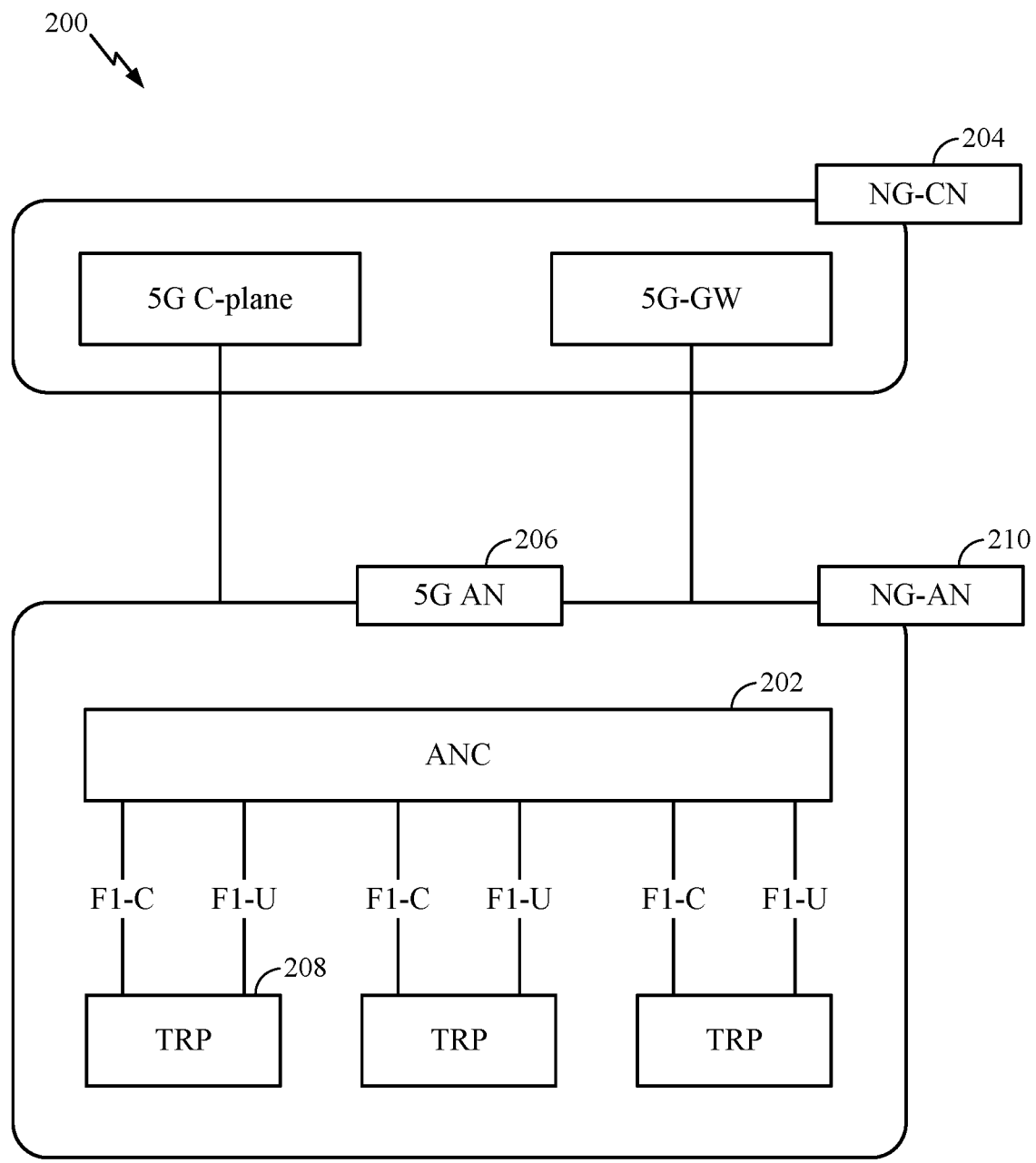
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication network 100 illustrated in FIG. 1. A 5G access node 206 may include an access node controller (ANC) 202. The ANC 202 may be a central unit (CU) of the distributed RAN 200. A backhaul interface to the Next Generation Core Network (NG-CN) 204 may terminate at the ANC 202. The backhaul interface to neighboring next generation access Nodes (NG-ANs) 210 may terminate at the ANC 202. The ANC 202 may include one or more TRPs 208 (e.g., cells, BSs, gNBs, etc.).

The TRPs 208 may be a distributed unit (DU). The TRPs 208 may be connected to a single ANC (e.g., ANC 202) or more than one ANC (not illustrated). For example, for RAN sharing, radio as a service (RaaS), and service specific AND deployments, the TRPs 208 may be connected to more than one ANC. The TRPs 208 may each include one or more antenna ports. The TRPs 208 may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter).

The logical architecture of the distributed RAN 200 may share features and/or components with LTE. For example, next generation access node (NG-AN) 210 may support dual connectivity with NR and may share a common fronthaul for LTE and NR.

The logical architecture of the distributed RAN 200 may enable cooperation between and among TRPs 208, for example, within a TRP and/or across TRPs via ANC 202. An inter-TRP interface may not be used.

Logical functions may be dynamically distributed in the logical architecture of the distributed RAN 200. As will be described in more detail with reference to FIG. 5, a radio resource control (RRC) layer, a packet data convergence protocol (PDCP) layer, a radio link control (RLC) layer, a medium access control (MAC) layer, and a physical (PHY) layers may be adaptably placed at the DU (e.g., TRP 208) or CU (e.g., ANC 202).

Figure 3:
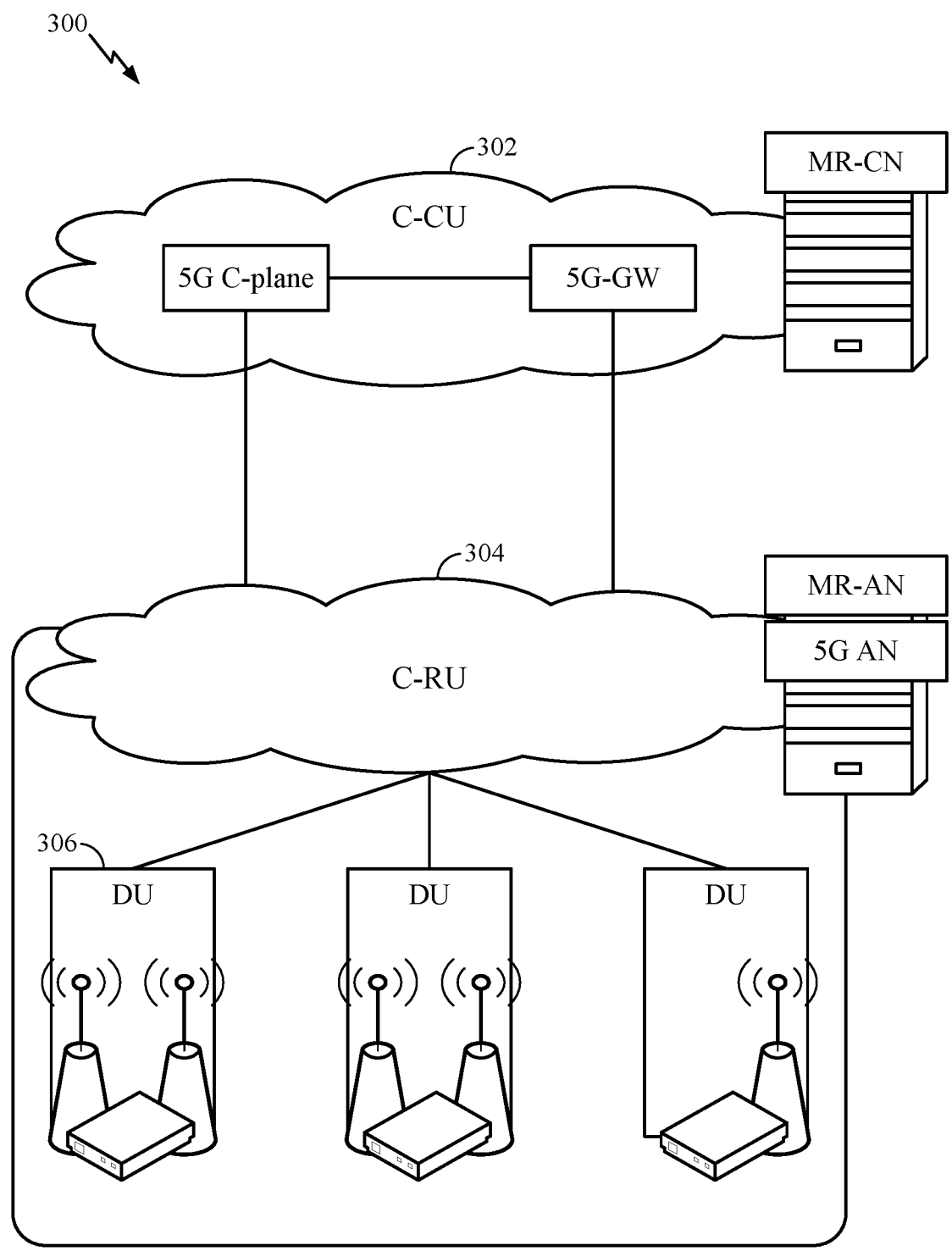
FIG. 3 is a diagram illustrating an example physical architecture of a distributed RAN, in accordance with certain aspects of the present disclosure.

FIG. 3 illustrates an example physical architecture of a distributed radio access network (RAN) 300, according to aspects of the present disclosure. A centralized core network unit (C-CU) 302 may host core network functions. The C-CU 302 may be centrally deployed. The C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to a network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
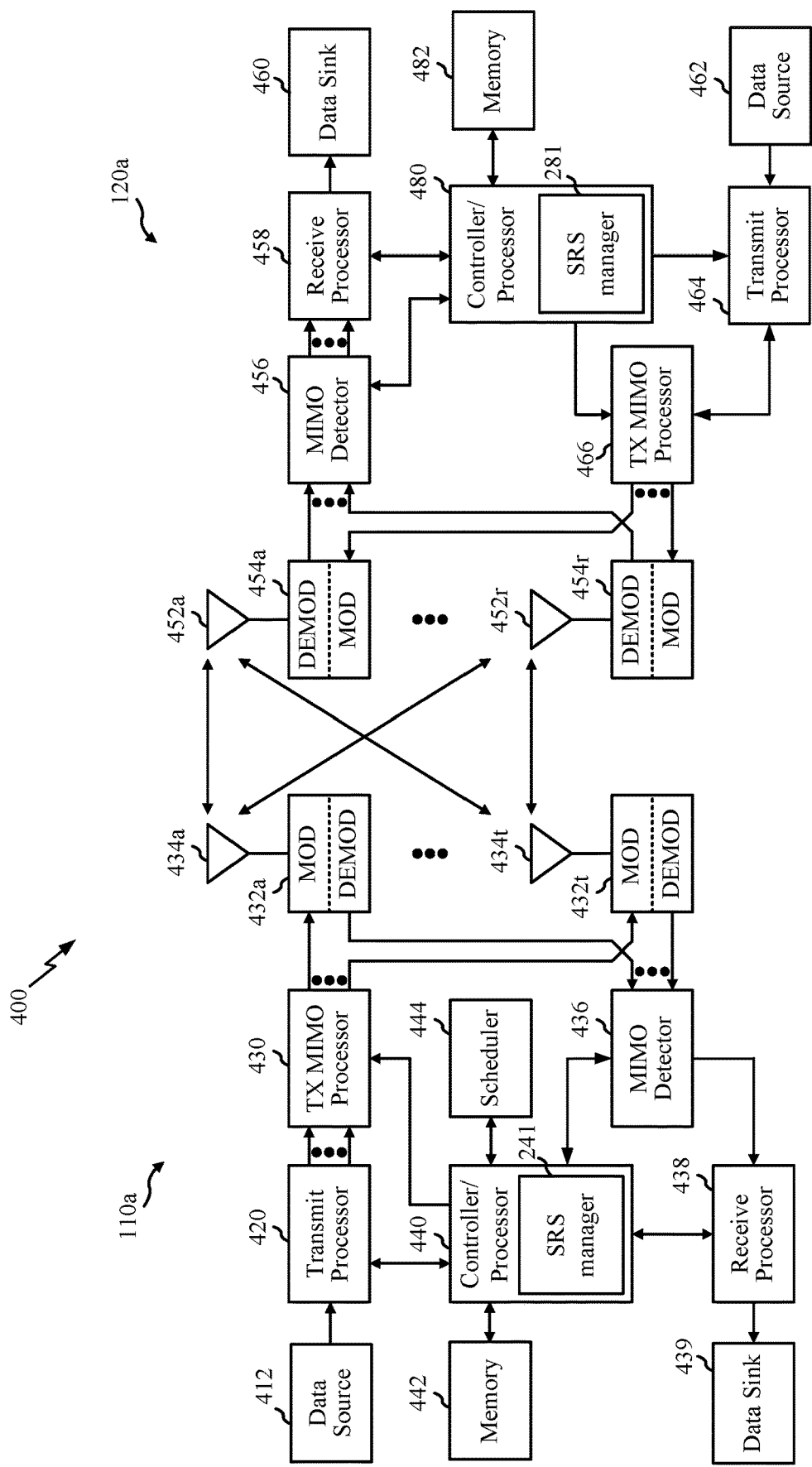
FIG. 4 is a block diagram conceptually illustrating a design of an example base station (BS) and user equipment (UE), in accordance with certain aspects of the present disclosure.

FIG. 4 illustrates example components of a BS 110 and a UE 120 (e.g., in the wireless communication network 100 of FIG. 1).

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit MIMO processor 430 may perform spatial processing (e.g., precoding) on the data symbols, the control symbols, and/or the reference symbols, if applicable, and may provide output symbol streams to modulators (MODs) in transceivers 432a through 432t. Each MOD in transceivers 432 may process a respective output symbol stream (e.g., for OFDM, etc.) to obtain an output sample stream. Each MOD in transceivers 432 may further process (e.g., convert to analog, amplify, filter, and upconvert) the output sample stream to obtain a DL signal. The DL signals from the MODs in transceivers 432a through 432t may be transmitted via antennas 434a through 434t, respectively.

At the UE 120a, antennas 452a through 452r may receive the DL signals from the BS 110 and may provide received signals to demodulators (DEMODs) in transceivers 454a through 454r, respectively. Each DEMOD in the transceiver 454 may condition (e.g., filter, amplify, downconvert, and digitize) a respective received signal to obtain input samples. Each DEMOD in the transceiver 454 may further process the input samples (e.g., for OFDM, etc.) to obtain received symbols. A MIMO detector 456 may obtain received symbols from all the DEMODs in the transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the UL, at UE 120a, a transmit processor 464 may receive and process data (e.g., for the physical uplink shared channel (PUSCH)) transmission from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a transmit MIMO processor 466 if applicable, further processed by the DEMODs in transceivers 454a through 454r (e.g., for SC-FDM, etc.), and transmitted to the BS 110. At the BS 110, the UL signals from the UE 120 may be received by the antennas 434, processed by the MOD in transceivers 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The memories 442 and 482 may store data and program codes for the BS 110a and the UE 120a, respectively. A scheduler 444 may schedule UEs for data transmission on the DL and/or the UL.

Antennas 452, processors 466, 458, 464, and/or controller/processor 480 of the UE 120a and/or antennas 434, processors 420, 430, 438, and/or controller/processor 440 of the BS 110a may be used to perform various techniques and methods described herein. For example, as shown in FIG. 4, the controller/processor 440 of the BS 110a has a SRS manager 441 that may be configured to perform the operations illustrated in FIG. 10, as well as other operations disclosed herein. As shown in FIG. 4, the controller/processor 480 of the UE 120a has a SRS manager 481 that may be configured to perform the operations illustrated in FIG. 9, as well as other operations disclosed herein, in accordance with aspects of the present disclosure. Although shown at the controller/processor, other components of the UE 120a and the BS 110a may be used performing the operations described herein.

NR may utilize orthogonal frequency division multiplexing (OFDM) with a cyclic prefix (CP) on the uplink and downlink. The NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 5:
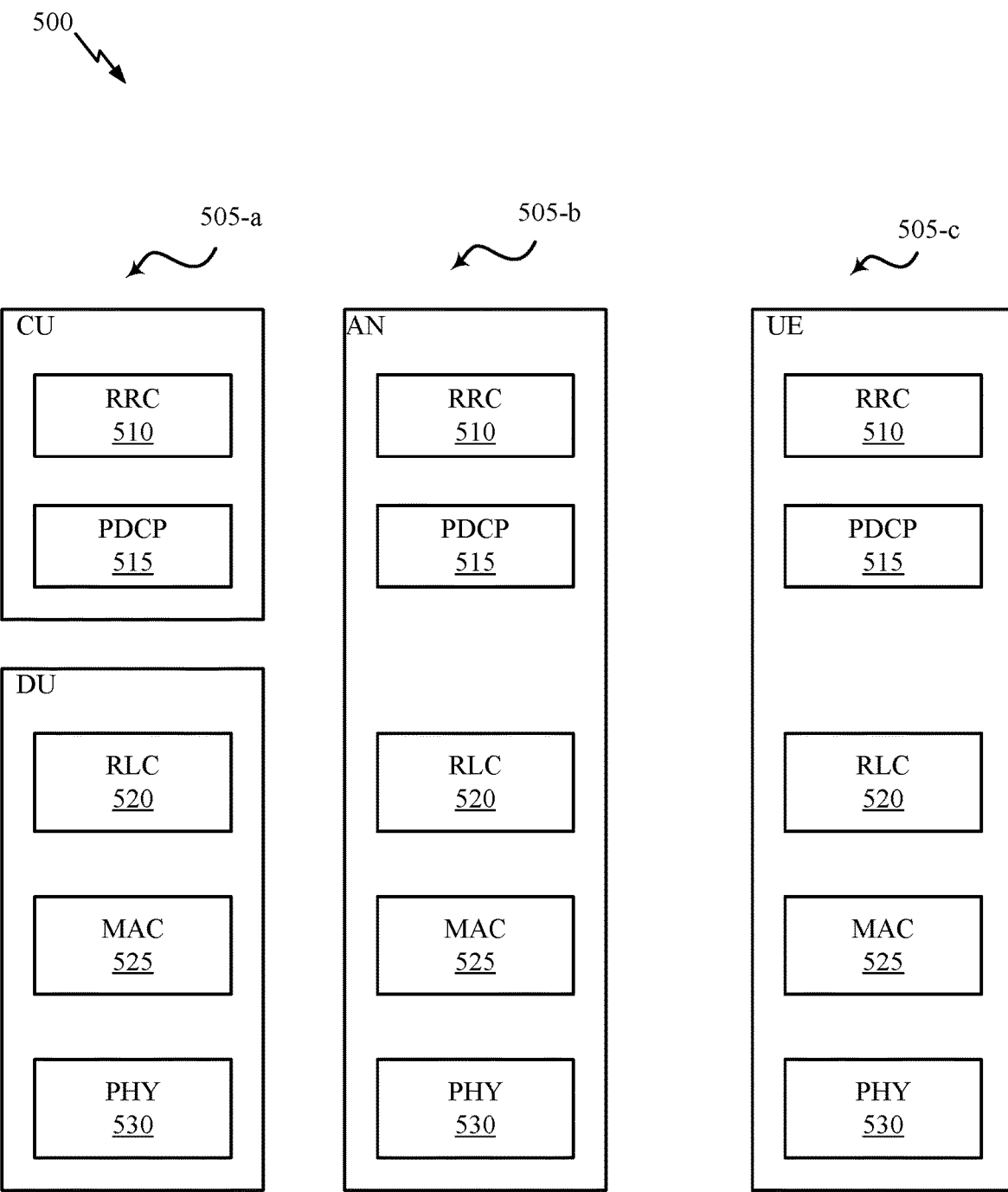
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). The diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., a DU such as TRP DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, the RRC layer 510, the PDCP layer 515, the RLC layer 520, the MAC layer 525, and the PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. The NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
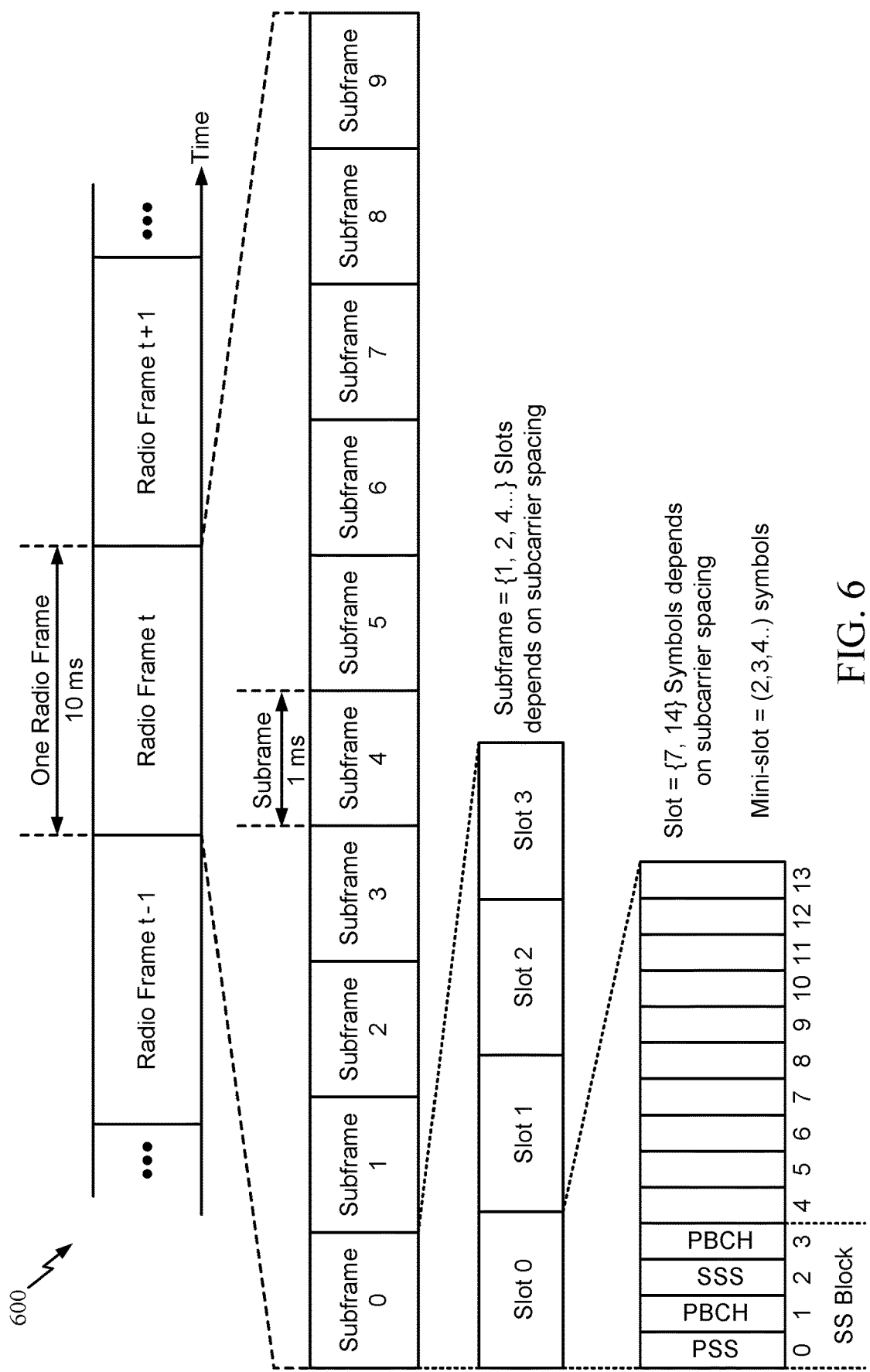
FIG. 6 illustrates an example of a frame format for certain wireless communication systems (e.g., new radio (NR)), in accordance with certain aspects of the present disclosure.

FIG. 6 is a diagram showing an example of a frame format 600 for NR. The transmission timeline for each of a DL and an UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSBs includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes. The SSB may be transmitted up to sixty-four times, for example, with up to sixty-four different beam directions for mmW. The multiple transmissions of the SSB are referred to as a SS burst set. SSBs in an SS burst set may be transmitted in the same frequency region, while SSBs in different SS bursts sets can be transmitted at different frequency regions.

Example SRS Transmissions

In wireless communication systems (e.g., $5^{th}$ generation (5G) new radio (NR)), a user equipment (UE) (e.g., such as the UE 120a in the wireless communication network 100) may transmit one or more sounding reference signals (SRSs) so that a network entity (e.g., such as the BS 110a in the wireless communication network 100). can measure uplink (UL) channel quality. Conventionally, one SRS is transmitted by the UE in a last symbol of a normal UL subframe. However, more recently, additional symbols have been introduced for transmitting the SRSs in a normal UL subframe.

The additional SRS symbols may be identified based on a flexible SRS symbol location configuration and/or a virtual cell ID associated with the UE that transmitted the (additional) SRSs. In this context, a "normal subframe" is contrasted with a "special subframe" such as those defined and placed between "normal downlink (DL) subframes" and "normal UL subframes" that are designed to allow the UE sufficient time to switch between receive and transmit processing.

Increasing SRS capacity by introducing more than one symbol for the SRSs on an UL normal subframe may be part of an overall support of and advance of coverage enhancements. Increasing the SRS capacity may involve introducing more than one symbol for the SRSs for one UE or for multiple UEs on a UL normal subframe. As a baseline, a minimum SRS resource allocation granularity for a cell may be one slot (e.g., one of two time slots of a subframe) or a subframe, when more than one symbol in a normal subframe is allocated for the SRSs for the cell. As noted above, a virtual cell ID may be introduced for the SRSs, allowing different SRSs transmissions to be distinguished.

Additionally, in some cases, intra-subframe frequency hopping and repetition may be supported for aperiodic SRSs in the additional SRS symbols of a normal UL subframe. The intra-subframe frequency hopping for the aperiodic SRSs transmission may involve transmitting aperiodic SRSs on different frequency bands on a symbol-by-symbol basis in a subframe. Additionally, the aperiodic SRSs repetition may involve repeating transmission of the aperiodic SRSs, transmitted in a first additional symbol of a subframe (e.g., using a first antenna, frequency band, etc.), in a second additional symbol of the subframe.

Further, intra-subframe antenna switching may be supported for the aperiodic SRSs in the additional SRS symbols. The intra-subframe antenna switching for the aperiodic SRSs transmission may involve transmitting the aperiodic SRSs using different antennas on a symbol-by-symbol basis in a subframe.

Both legacy SRS and additional SRS symbol(s) may be configured for the same UE. In some cases, the legacy SRS may be a periodic SRS (P-SRS) or an aperiodic SRS (A-SRS). Additionally, in some cases, the additional SRSs may be aperiodically triggered. Currently, the UE may be allowed to transmit periodic legacy SRSs and aperiodic additional SRSs in the same normal UL subframe. In the case of aperiodic legacy SRS, a UE may transmit only one of legacy SRS or additional SRS symbol(s) in a normal UL subframe.

The time location of possible additional SRS symbols in one normal UL subframe for a cell may be selected from various options. According to a first option, all symbols in only one slot of one subframe may be used for the SRSs from the cell perspective. According to a second option, all symbols in one subframe may be used for the SRSs from the cell perspective. In some cases, cell-specific configurations of SRS resources in slot-level granularity may be implemented.

Example Support of Multiple SRS in the Same Subframe

As noted above, in certain wireless communication systems (e.g., In LTE Rel-16), multiple sounding reference signals (SRSs) transmissions in a single uplink (UL) subframe may be supported. In contrast, in earlier (legacy) releases of LTE, only a single SRS in a normal UL subframe is supported.

The configuration of multiple SRSs may be quite flexible, allowing for various features and enhancements, such as repetition, frequency hopping, and antenna switching. With the repetition, a SRS is transmitted with a same antenna in contiguous symbols. With the frequency hopping, the SRS is transmitted in a first bandwidth in a first symbol and in a second bandwidth in a second symbol. With the antenna switching, the SRS is transmitted from a first antenna in a first symbol and from a second antenna in a second symbol.

Figure 7:
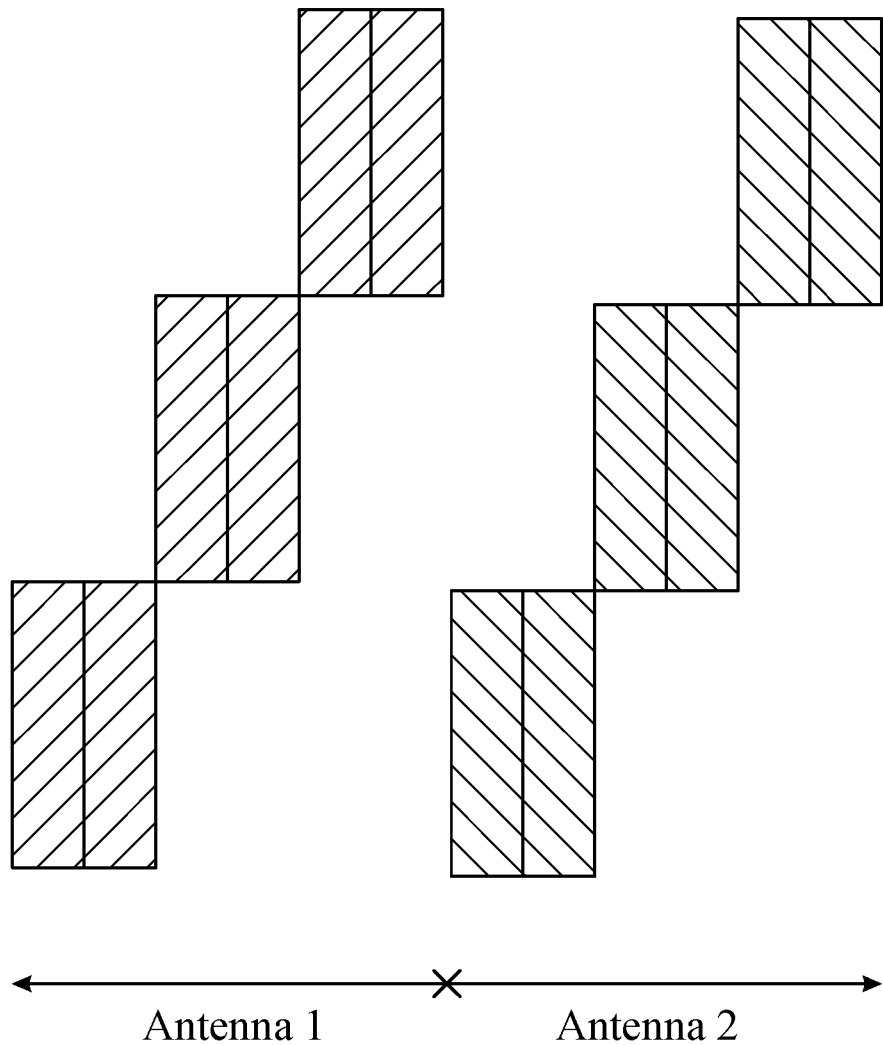
FIG. 7 illustrates an example of sounding reference signals (SRSs) transmissions with repetition, frequency hopping, and antenna switching, in accordance with certain aspects of the present disclosure.

The features, such as the repetition, the frequency hopping, and the antenna switching may be combined for the SRSs transmissions. One example of the SRSs transmissions with the repetition, the frequency hopping, and the antenna switching is illustrated in FIG. 7. For example, FIG. 7 shows repetition of two (R=2), frequency hopping across three different bandwidths, and antenna switching across two antennas (such as Antenna 1 and Antenna 2).

Figure 8:
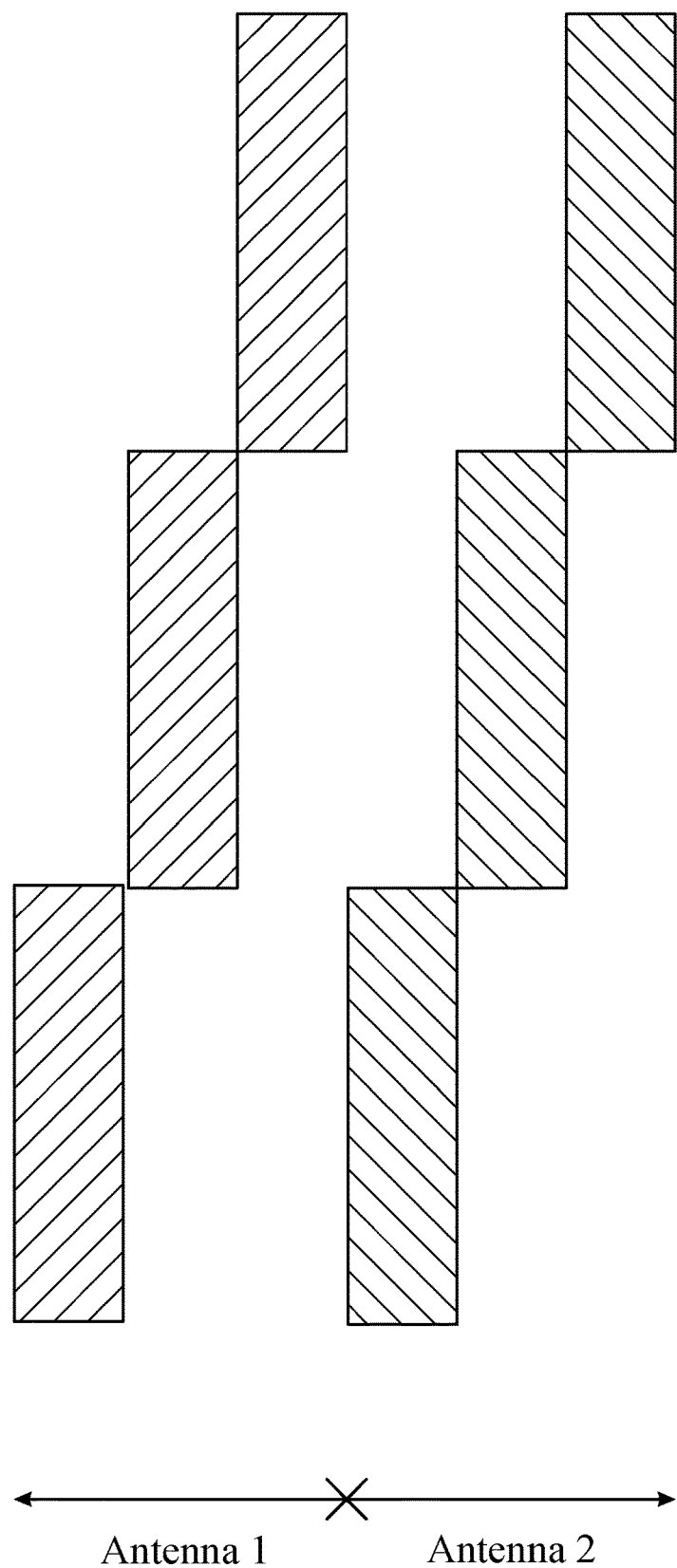
FIG. 8 illustrates an example of SRSs transmissions with frequency hopping and antenna switching, but no repetition, in accordance with certain aspects of the present disclosure.

Another example of the SRSs transmissions with the frequency hopping and the antenna switching but no repetition is illustrated in FIG. 8. For example, FIG. 8 shows frequency hopping across three different bandwidths and antenna switching across two antennas (such as Antenna 1 and Antenna 2), but without repetition.

Additionally, while not shown in FIG. 7, gaps (symbols) may be introduced to allow sufficient time for retuning (for the frequency hopping) or changing antennas (for the antenna switching). The gaps may be needed, for example, if a carrier frequency needs to be changed to transmit the one or more SRSs in a different part of a frequency band when hopping frequencies (e.g., the frequency hopping is not digital). These gaps are configurable by a network entity.

The availability of several advanced features and configurable gaps results in a large number of possible SRS configurations, which presents a challenge in terms of a user equipment (UE) implementation. For example, some configurations that are likely to occur infrequently (corner cases) may be very difficult to implement and, for full support, the UE might have to support these configurations anyway (even when no operator is likely to support them). Further, it may be practically impossible to test all the possible combinations, especially the full range of combinations of the repetition, the antenna switching, the frequency hopping, and configurable gaps.

Aspects of the present disclosure, however, provide techniques that may allow a UE, via expanded UE capability signaling, to indicate limitations that might prevent the UE from supporting all possible SRSs configuration combinations.

Figure 9:
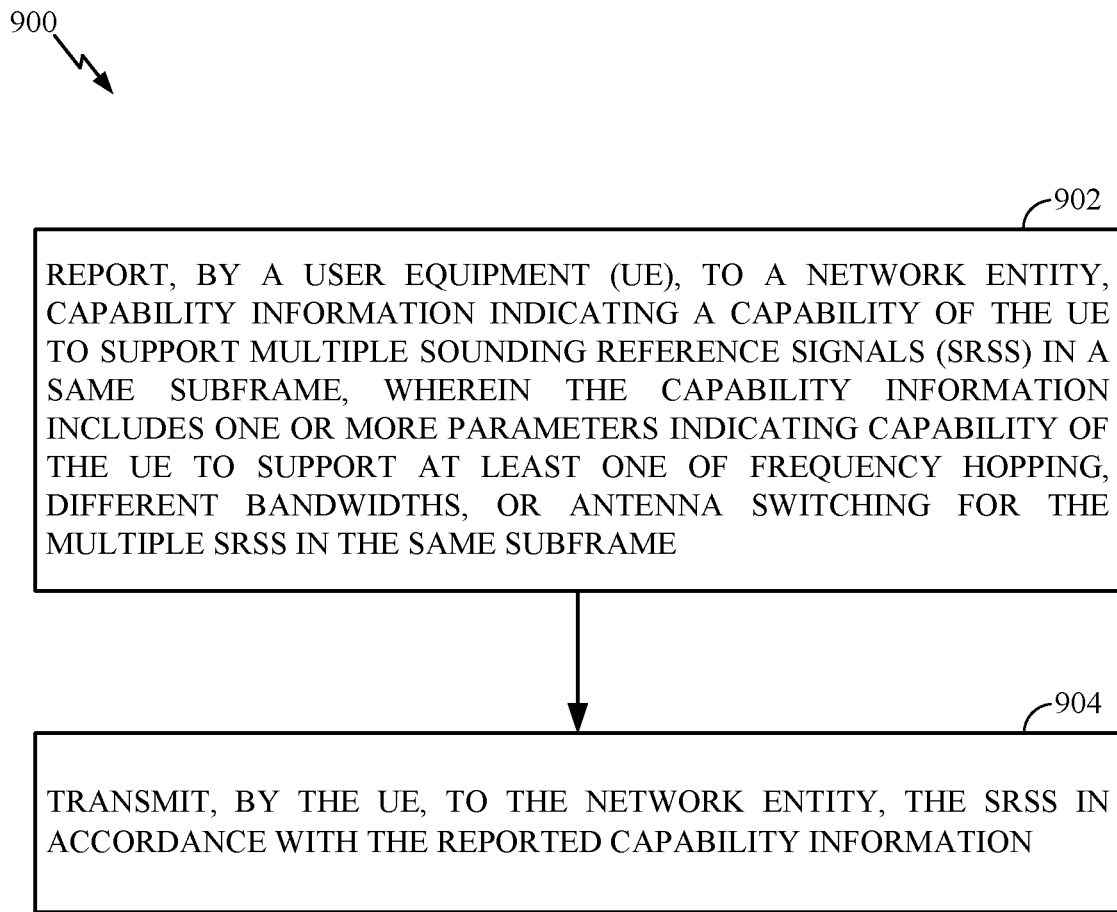
FIG. 9 is a flow diagram illustrating example operations for wireless communications by a UE, in accordance with certain aspects of the present disclosure.

FIG. 9 is a flow diagram illustrating example operations 900 for wireless communications, in accordance with certain aspects of the present disclosure. The operations 900 may be performed by a UE (e.g., such as the UE 120a in the wireless communication network 100) to indicate its capability to support multiple SRS transmissions in a single subframe and with what advanced features. The operations 900 may be implemented as software components that are executed and run on one or more processors (e.g., the controller/processor 480 of FIG. 4). Further, the transmission and reception of signals by the UE in operations 900 may be enabled, for example, by one or more antennas (e.g., the antennas 452 of FIG. 4). In certain aspects, the transmission and/or reception of signals by the UE may be implemented via a bus interface of one or more processors (e.g., the controller/processor 480) obtaining and/or outputting signals.

The operations 900 begin, at 902, by reporting, to a network entity (e.g., such as the BS 110a in the wireless communication network 100), capability information indicating a capability of the UE to support multiple SRSs in a same subframe. The capability information includes one or more parameters indicating capability of the UE to support at least one of frequency hopping, different bandwidths, or antenna switching for the multiple SRSs in the same subframe.

At 904, the UE transmits the SRSs to the network entity in accordance with the capability information. For example, the network entity determines an SRS configuration for the UE based on the capability information of the UE, and configure the UE accordingly. The UE then transmits the SRSs to the network entity.

Figure 10:
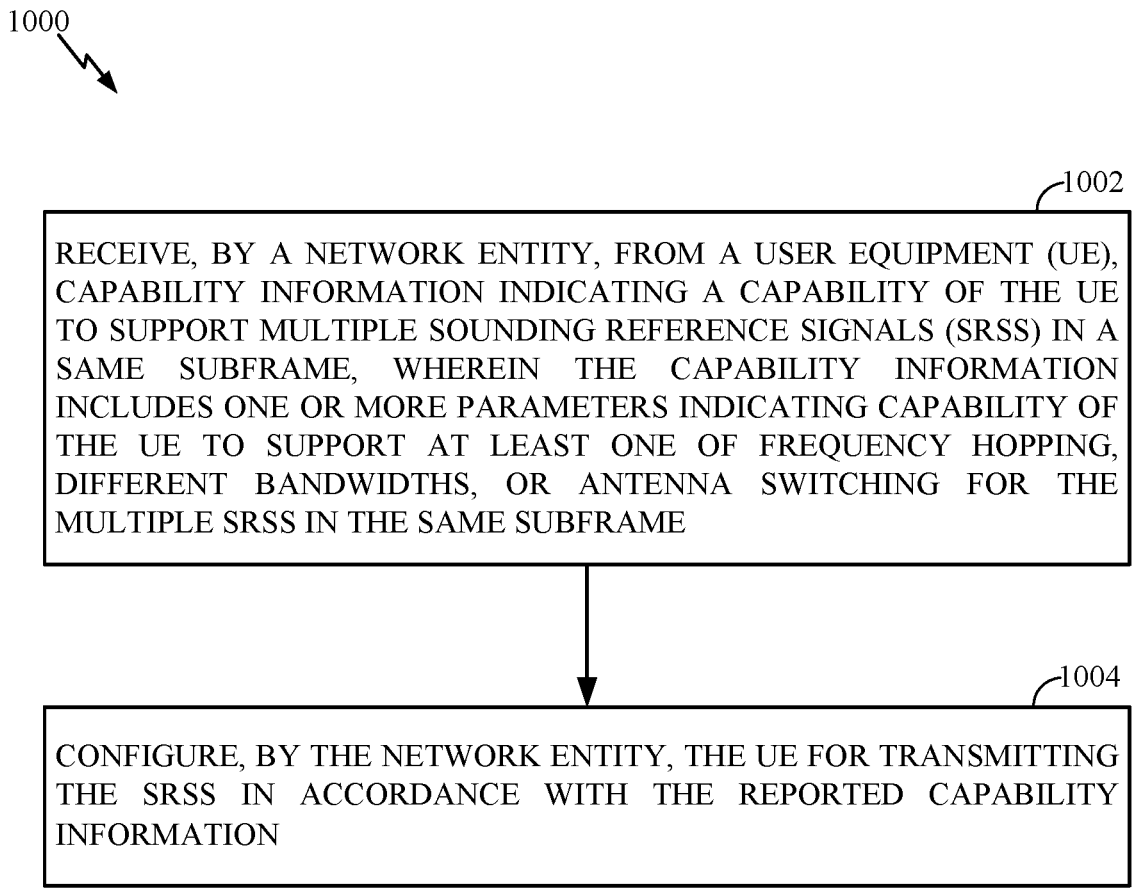
FIG. 10 is a flow diagram illustrating example operations for wireless communications by a network entity, in accordance with certain aspects of the present disclosure.

FIG. 10 is a flow diagram illustrating example operations 1000 for wireless communications. The operations 1000 may be configured complementary to the operations 900 of FIG. 9. The operations 1000 may be performed by a network entity (e.g., such as the BS 110a in the wireless communication network 100) to configure the UE 120a 110a in the wireless communication network 100 based on its capability to support multiple SRSs transmissions in a single subframe (reported in accordance with operations 900 of FIG. 9). The operations 1000 may be implemented as software components that are executed and run on one or more processors (e.g., the controller/processor 440 of FIG. 4). Further, the transmission and reception of signals by the network entity in operations 1000 may be enabled, for example, by one or more antennas (e.g., the antennas 434 of FIG. 4). In certain aspects, the transmission and/or reception of signals by the network entity may be implemented via a bus interface of one or more processors (e.g., the controller/processor 440) obtaining and/or outputting signals.

The operations 1000 begin, at 1002, by receiving, from a UE, capability information indicating a capability of the UE to support multiple SRSs in a same subframe. The capability information includes one or more parameters indicating capability of the UE to support at least one of frequency hopping, different bandwidths, or antenna switching for the multiple SRSs in the same subframe.

At 1004, the network entity configures the UE for transmitting the SRSs in accordance with the capability information. The network entity monitors for the SRSs transmissions sent by the UE, in accordance with the capability configuration.

In certain aspects, the UE may report various types of parameters to the network entity to indicate the capability information associated with the UE to support the frequency hopping, the different bandwidths, or the antenna switching for the multiple SRSs in the same subframe. The parameters may be reported per band, per band combination, and/or per band of band combination.

In certain aspects, a parameter (that may be reported by the UE to the network entity) may indicate a maximum number of SRS symbols the UE supports per subframe. The parameter may be useful for the network entity as one of the potential limitations of the UE is that, when configured with the frequency hopping or the antenna switching, the UE may need to change power/frequency of the SRSs after every frequency hop or antenna switch. The radio frequency of the UE may not have the capability to process all these changes (e.g. a limitation of number of the frequency hopping or the antenna switching per subframe).

For example, considering an example with 10 symbols and frequency hopping in different bandwidths in each symbol, the UE may need to adjust transmit power (e.g., power amplifier setting) to match each frequency band. The UE radio frequency components may be designed to only handle a certain number of power levels per subframe, such as 3 power levels (which may allow for 2 physical uplink control channel (PUCCH) transmissions with the frequency hopping and 1 for SRS). A gap may be one symbol (or multiple symbols) long and generally, may not be included when counting a number of power changes.

Similarly, repetition generally uses the same power and frequency resources (and, thus, do not require a power change). Referring back to FIG. 7, the illustrated example may effectively count as 6 SRS symbols, not 12 (adjusting for the repetition).

For these reasons, when the UE determines what maximum number of SRS symbols per subframe it is to report, there are various alternatives for considering the gaps and/or the repetition. According to a first alternative, if the UE is configured with the gaps between the SRS symbols, the gaps are not counted towards a total of the maximum number of SRS symbols the UE supports per subframe (e.g. 2 antennas+1 gap counts as 2 symbols). According to a second alternative, the gaps are counted towards the total (e.g. 2 antennas+1 gap counts as 3 symbols). According to a third alternative, if the repetition is used for transmitting the SRSs, the repetition is not counted towards the total. According to a fourth alternative, the repetitions are counted towards the total.

In some cases, this limitation regarding a maximum number of SRS symbols (and/or other reported limitations) may only apply if the UE is configured with the frequency hopping and/or the antenna switching (otherwise any number of SRSs may be supported). Further the limitation regarding a maximum number of SRS symbols (and/or other reported limitations) may be reported per band, per band combination, or per band of band combination.

In certain aspects, a parameter may indicate different number of antennas (such as transmit antennas and receive antennas) that a UE may support for transmitting the multiple SRSs in the same subframe than for a single SRS in the same subframe. In current (legacy) systems, the UE is only able to indicate one capability. For example, in a given frequency band in a frequency band combination, the UE reports whether the UE supports 1T2R (1 transmit and 2 receive antennas), 1T4R (1 transmit and 4 receive antennas), and/or 2T4R (2 transmit and 4 receive antennas). This antenna switching capability is for a single SRS in a normal UL subframe, and for the SRS in an UL pilot time slot (UpPTS).

Aspects of the present disclosure, however, allow the UE to report different antenna switching capabilities, for example, to accommodate the additional complications of multiple SRSs in a normal UL subframe. For example, the UE may report separate capabilities (e.g. per band of band combination) of the support of different combinations of antenna selection. For example, the UE may support 1T4R with single SRS, but only 1T2R with multiple SRS.

In certain aspects, a parameter may indicate support of frequency hopping such as an intra-subframe frequency hopping. This may help address one of the main complications of supporting the frequency hopping, which depends on whether a UE has to do "analog" or "digital" hopping. In analog frequency hopping, a local oscillator (LO) is tuned to a center of a SRS band. In such cases, after a frequency hop, the LO has to be retuned (to the center of a new SRS band). In digital hopping, the LO is tuned to the center of a component carrier. In such cases, a baseband processor performs the digital frequency hopping just by placing data in different subcarriers.

In some cases, the analog frequency hopping may be the only option, for example, due to issues with the digital frequency hopping. For example, with the digital frequency hopping, "mirror emissions" may appear due to a small allocation being placed far away from the DC subcarrier. The usage of digital versus analog frequency hopping may depend on a variety of factors, such as a SRS bandwidth or a particular band of operation (as different bands may have different emission requirements).

In certain aspects, a UE may indicate support of the intra-subframe frequency hopping. For example, the UE may decide to indicate support (or lack of support) for the intra-subframe frequency hopping, depending on a band (in a band combination), depending on a SRS bandwidth, and/or depending on a configuration (or not) of gaps in the subframe.

In some cases, the UE can report (for a band of band combination), for different values of bandwidth of SRSs, whether the UE supports frequency hopping and, if so, whether the UE needs gaps or not. For example, this may be signaled by zero or more thresholds of bandwidths $X_i$ and one or more indications for support of capabilities $Y_i$. One or both of $X_i$ and $Y_i$ may be signaled by the UE or fixed in a specification. For example, if X=[4, 10] and Y=[notSupport, supportWithGaps, supportWithoutGaps], this may mean that:

For less than 4 PRBs of SRS bandwidth, the UE does not support frequency hopping;
For SRS bandwidth between 4 and 10 PRBs, the UE supports frequency hopping with gaps; and
For SRS bandwidth more than 10 PRBs, the UE supports frequency hopping without gaps.

In some cases, such signaling may be simplified. For example, one simplification is for the UE to signal two values of X, and the values of Y are always assumed to be [notSupport, supportWithGaps, supportWithoutGaps]. In this case, X can include values 0 and 100 (or larger). As another example of simplification, the support of the gaps by the UE may be signaled by a separate capability. In such cases, the UE may only signal a single threshold X. This may be interpreted as meaning that if SRS bandwidth is below a first bandwidth threshold, the UE does not support intra-subframe FH, while if the SRS bandwidth is above a second bandwidth threshold, the UE does support intra-frame FH. The UE may support the intra-subframe frequency hopping without the gaps if the SRS bandwidth is above the second bandwidth threshold. The UE may support the intra-subframe frequency hopping with the gaps if the SRS bandwidth is between the first bandwidth threshold and the second bandwidth threshold.

In certain aspects, the capability information to support the frequency hopping may depend on a number of repetitions used for the SRSs transmissions.

In certain aspects, the capability information may indicate a number of symbols between frequency hops for the UE to support the frequency hopping without gaps.

In certain aspects, the UE may indicate support of antenna switching such as intra-subframe antenna switching. One potential complication of the antenna switching is to program a radio frequency front end to perform the switch in a certain time. In many cases, the radio frequency hardware (card) may not have the capability to perform very fast switches (e.g., to switch back to back for many symbols).

In certain aspects, a UE may be able to report, for each frequency band in a frequency band combination, whether the UE should be configured with gaps for antenna switching. This may provide flexibility, for example, to accommodate when it may be easier for the UE to perform the frequency hopping and the antenna switching if they are not performed back to back (in adjacent symbols). For example, referring to FIG. 7, with repetition (R=2), it may be easier for the UE to perform the frequency hopping and the antenna switching, than without repetition (as in the example of FIG. 8), since the UE has more time to prepare for each frequency hop and/or antenna switch.

There are various alternatives for the UE to report the support of the frequency hopping and/or the antenna switching with or without the gaps, and may report different support for different repetition values.

In one example, the frequency hopping and/or the antenna switching capabilities may be reported separately, for example, once for R=1 (no repetition) and once for R>1 (with repetition).

In another example, with R>1, a UE may support the frequency hopping and/or the antenna switching without gaps, and with R=1 the UE may report the capability (with gaps).

In another example, a UE may report multiple values of repetition and multiple capabilities for the frequency hopping, the antenna switching, and/or the gaps corresponding to each of the values of R. As an alternative, the UE may report a value of R (as a threshold) and two capabilities (or sets of capabilities) for the frequency hopping, the antenna switching, and/or the gaps (one for repetitions below R, one above R).

Figure 11:
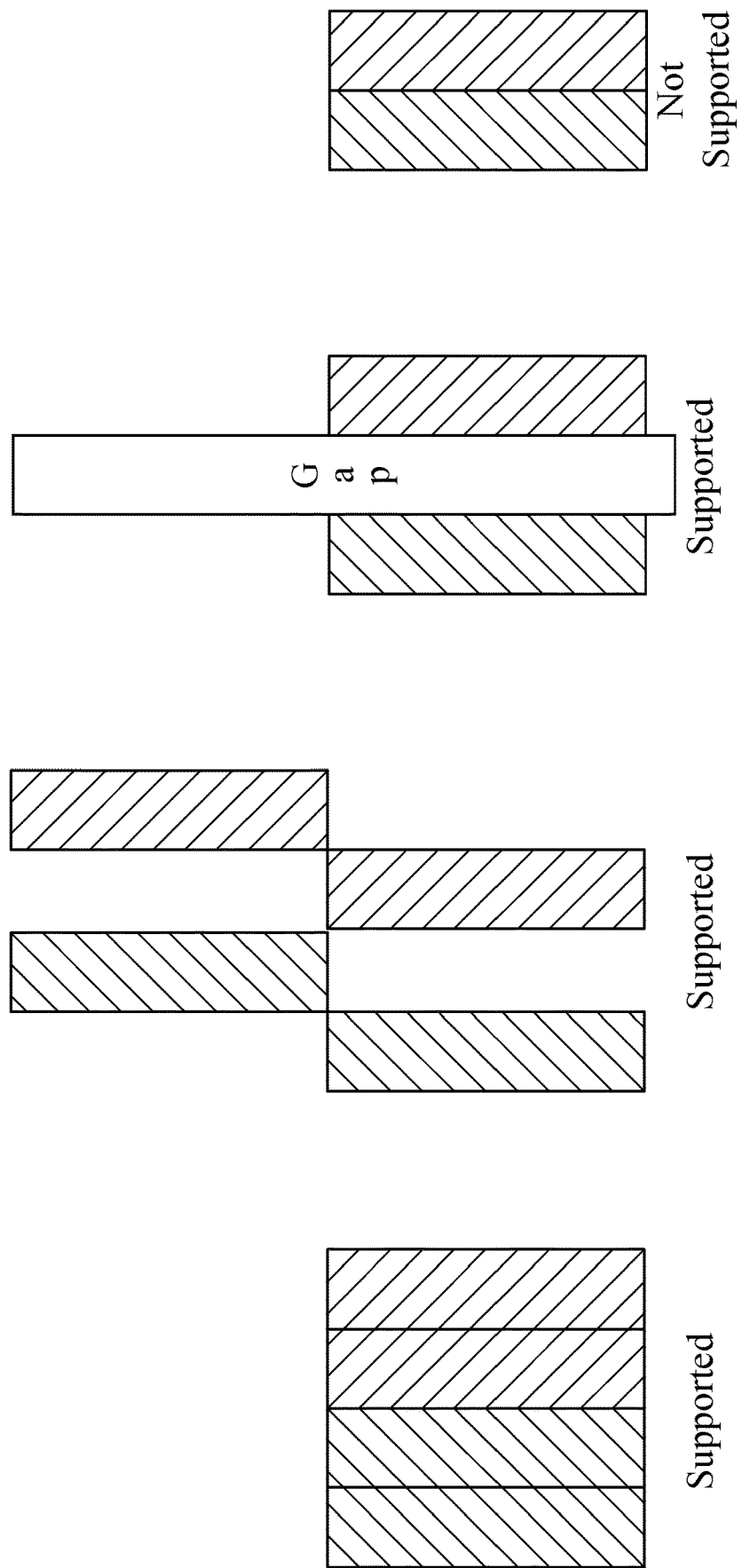
FIG. 11 illustrates examples of supported and unsupported SRSs transmission configurations for a given UE capability reported, in accordance with certain aspects of the present disclosure.

In certain aspects, a UE may report a number of symbols the UE should be configured with between antenna switches (or frequency hops) to operate without gaps. For example, assuming the UE reports N=2 (that the UE should be configured with at least 2 symbols between consecutive frequency hopping and/or the antenna switching), the UE may support a first two configurations shown in FIG. 11 without gaps, and a third configuration in FIG. 11 (with a gap between antenna switching). A fourth configuration may not be supported, however, as there is not 2 symbols between the antenna switching.

In certain aspects, if a UE performs frequency hopping and antenna switching in a same symbol, then the UE may be configured with a gap IF (the UE reports that) either frequency hopping or antenna switching requires a gap.

In certain aspects, the capability information may indicate whether a UE is able to support different types of SRS in a same subframe. For example, legacy SRSs and additional SRSs can be configured in the same subframe, with potentially different power control parameters. To accommodate such cases, the UE may be configured to report whether legacy P-SRS and/or AP-SRS can be configured together with the additional SRSs in the same subframe. If the UE does report that legacy P-SRS and/or AP-SRS can be configured together with the additional SRSs in the same subframe, the UE may also report whether a gap is needed between legacy and additional SRSs if different power due to frequency hopping, antenna switching, and/or power control. As an alternative or in addition, the UE may report whether there is power restriction between power level of legacy SRSs and additional SRSs in the same subframe.

Figure 12:
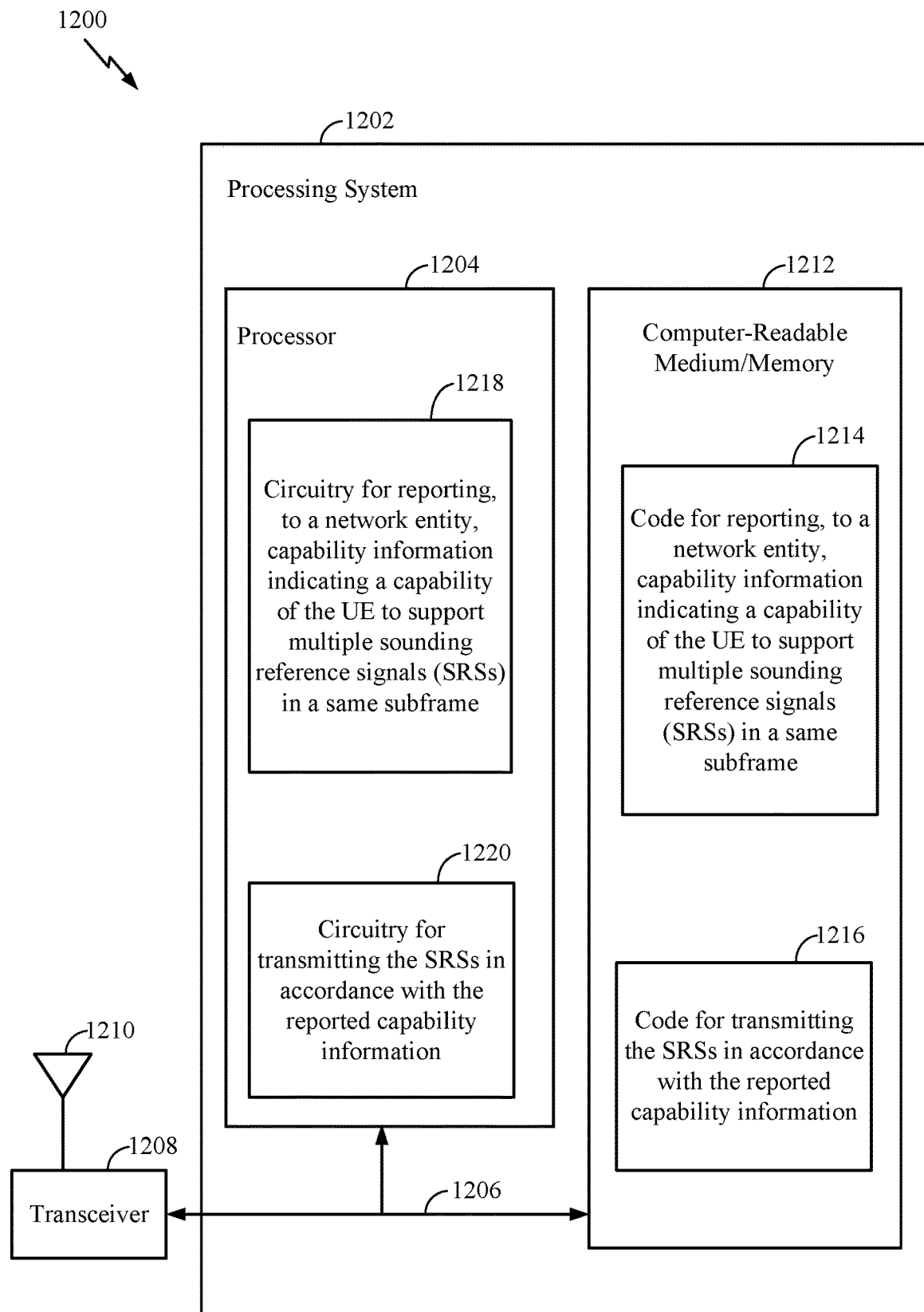
FIG. 12 illustrates a communications device that may include various components configured to perform operations for techniques disclosed herein, according to aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 is configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., a computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for reporting and code 1216 for transmitting. The code 1214 for reporting may include code for reporting, to a network entity, capability information indicating a capability of the UE to support multiple SRSs in a same subframe where the capability information includes one or more parameters indicating capability of the UE to support at least one of frequency hopping, different bandwidths, or antenna switching for the multiple SRSs in the same subframe. The code 1216 for transmitting may include code for transmitting the SRSs in accordance with the reported capability information.

The processor 1204 may include circuitry configured to implement the code stored in the computer-readable medium/memory 1212, such as for performing the operations illustrated in FIG. 9, as well as other operations for performing the various techniques discussed herein. For example, the processor 1204 includes circuitry 1218 for reporting and circuitry 1220 for transmitting. The circuitry 1218 for reporting may include circuitry for reporting, to a network entity, capability information indicating a capability of the UE to support multiple SRSs in a same subframe where the capability information includes one or more parameters indicating capability of the UE to support at least one of frequency hopping, different bandwidths, or antenna switching for the multiple SRSs in the same subframe. The circuitry 1220 for transmitting may include circuitry for transmitting the SRSs in accordance with the reported capability information.

Figure 13:
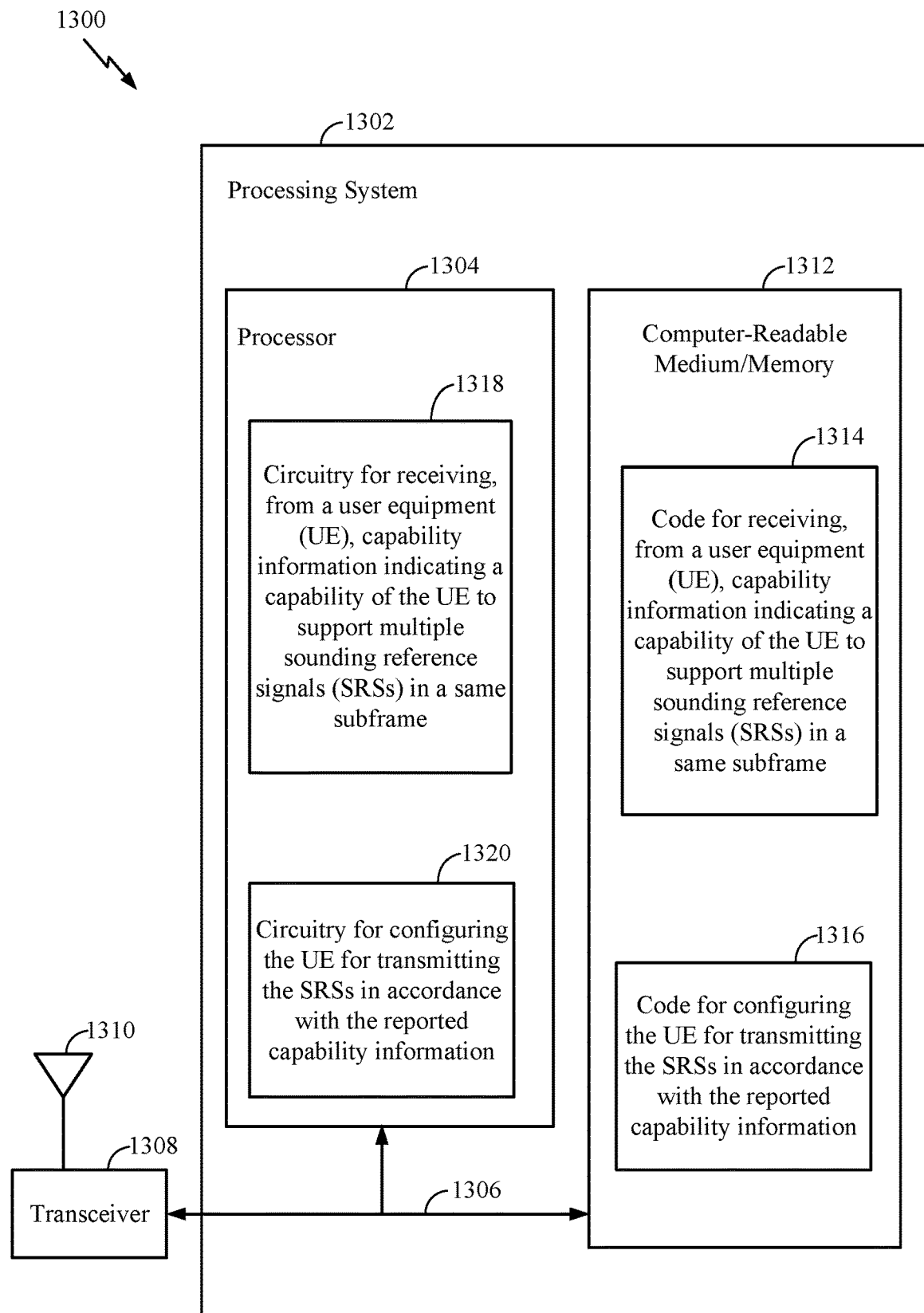
FIG. 13 illustrates a communications device that may include various components configured to perform operations for techniques disclosed herein, according to aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 is configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., a computer-executable code) that when executed by the processor 1304, cause the processor 1304 to perform the operations illustrated in FIG. 10, or other operations for performing the various techniques discussed herein. In certain aspects, computer-readable medium/memory 1312 stores code 1314 for receiving and code 1316 for configuring. The code 1314 for receiving may include code for receiving from a UE capability information indicating a capability of the UE to support multiple SRSs in a same subframe where the capability information includes one or more parameters indicating capability of the UE to support at least one of frequency hopping, different bandwidths, or antenna switching for the multiple SRSs in the same subframe. The code 1316 for configuring may include code for configuring the UE for transmitting the SRSs in accordance with the reported capability information.

The processor 1304 may include circuitry configured to implement the code stored in the computer-readable medium/memory 1312, such as for performing the operations illustrated in FIG. 10, as well as other operations for performing the various techniques discussed herein. For example, the processor 1304 includes circuitry 1318 for receiving and circuitry 1320 for configuring. The circuitry 1318 for receiving may include circuitry for receiving from a UE capability information indicating a capability of the UE to support multiple SRSs in a same subframe where the capability information includes one or more parameters indicating capability of the UE to support at least one of frequency hopping, different bandwidths, or antenna switching for the multiple SRSs in the same subframe. The circuitry 1320 for configuring may include circuitry for configuring the UE for transmitting the SRSs in accordance with the reported capability information.

Example Aspects

Implementation examples are described in the following numbered aspects.

In a first aspect, a method for wireless communications by a user equipment (UE), comprising: reporting, to a network entity, capability information indicating a capability of the UE to support multiple sounding reference signals (SRSs) in a same subframe, wherein the capability information comprises one or more parameters indicating capability of the UE to support at least one of frequency hopping, different bandwidths, or antenna switching for the multiple SRSs in the same subframe; and transmitting the SRSs in accordance with the capability information.

In a second aspect, alone or in combination with the first aspect, at least one of the one or more parameters are reported per band, per band combination, or per band of band combination.

In a third aspect, alone or in combination with one or more of the first and second aspects, the one or more parameters comprise a maximum number of SRS symbols the UE supports per subframe, and wherein the maximum number of SRS symbols the UE supports per subframe is only applicable if the UE is configured with at least one of the antenna switching or the frequency hopping.

In a fourth aspect, alone or in combination with one or more of the first through third aspects, the one or more parameters comprise: a number of transmit antennas and receive antennas the UE supports for transmitting multiple SRSs in the same subframe.

In a fifth aspect, alone or in combination with one or more of the first through fourth aspects, the UE reports support for a different number of transmit antennas and receive antennas for transmitting multiple SRSs in the same subframe than for a single SRS in the same subframe.

In a sixth aspect, alone or in combination with one or more of the first through fifth aspects, the one or more parameters indicate support of intra-subframe frequency hopping depending on at least one of a band, a band combination, a band of band combination, a SRS bandwidth, or a configuration of gaps in the subframe.

In a seventh aspect, alone or in combination with one or more of the first through sixth aspects, the one or more parameters indicate at least one of: one or more bandwidth thresholds, for which the UE supports the intra-subframe frequency hopping with or without gaps; a first bandwidth threshold, wherein the UE does not support the intra-subframe frequency hopping if the SRS bandwidth is below the first bandwidth threshold; or a second bandwidth threshold, wherein the UE supports the intra-subframe hopping if the SRS bandwidth is above the second bandwidth threshold.

In an eighth aspect, alone or in combination with one or more of the first through seventh aspects, the UE supports the intra-subframe frequency hopping without the gaps if the SRS bandwidth is above the second bandwidth threshold; and the UE supports the intra-subframe frequency hopping with the gaps if the SRS bandwidth is between the first bandwidth threshold and the second bandwidth threshold.

In a ninth aspect, alone or in combination with one or more of the first through eighth aspects, the capability information to support the frequency hopping depends, at least in part, on a number of repetitions used for the SRS transmissions.

In a tenth aspect, alone or in combination with one or more of the first through ninth aspects, the capability information indicates a number of symbols between frequency hops for the UE to support the frequency hopping without gaps.

In an eleventh aspect, alone or in combination with one or more of the first through tenth aspects, the one or more parameters comprise: a maximum number of SRS symbols the UE supports per subframe.

In a twelfth aspect, alone or in combination with one or more of the first through eleventh aspects, when the UE is configured with gaps between SRS symbols, the gaps are not counted towards the maximum number of SRS symbols the UE supports per subframe.

In a thirteenth aspect, alone or in combination with one or more of the first through twelfth aspects, when repetition is used for transmitting the SRSs, repetitions are not counted towards the maximum number of SRS symbols the UE supports per subframe.

In a fourteenth aspect, alone or in combination with one or more of the first through thirteenth aspects, the one or more parameters indicate, for each band in a band combination, whether the UE is to be configured with gaps to support intra-subframe antenna switching, wherein the capability information to support antenna switching depends, at least in part, on a number of repetitions used for the SRSs transmissions, and wherein the capability information indicates a number of symbols between antenna switches for the UE to support the antenna switching without gaps.

In a fifteenth aspect, alone or in combination with one or more of the first through fourteenth aspects, when the UE performs frequency hopping and antenna switching in the same symbol, then a gap is configured if the UE indicates it is to be configured with a gap to support either frequency hopping, antenna switching, or both.

In a sixteenth aspect, alone or in combination with one or more of the first through fifteenth aspects, the capability information also indicates whether the UE is able to support different types of SRS in the same subframe, and when the capability information indicates UE is able to support different types of SRS in the same subframe, the capability information also indicates at least one of: whether the UE is to be configured with a gap between SRS of different types due to at least one of frequency hopping, antenna switching, or power control; or whether there is a power restriction between power levels of the SRS of different types.

In a seventeenth aspect, a method for wireless communications by a network entity, comprises: receiving, from a user equipment (UE), capability information indicating a capability of the UE to support multiple sounding reference signals (SRSs) in a same subframe, wherein the capability information comprises one or more parameters indicating capability of the UE to support at least one of frequency hopping, different bandwidths, or antenna switching for the multiple SRSs in the same subframe; and configuring the UE for transmitting the SRSs in accordance with the capability information.

In an eighteenth aspect, alone or in combination with the seventeenth aspect, at least one of the one or more parameters are reported per band, per band combination, or per band of band combination.

In a nineteenth aspect, alone or in combination with one or more of the seventeenth and eighteenth aspects, the one or more parameters comprise: a maximum number of SRS symbols the UE supports per subframe.

In a twentieth aspect, alone or in combination with one or more of the seventeenth through nineteenth aspects, when the UE is configured with gaps between SRS symbols, the gaps are not counted towards the maximum number of SRS symbols the UE supports per subframe.

In a twenty-first aspect, alone or in combination with one or more of the seventeenth through twentieth aspects, when repetition is used for transmitting the SRS, repetitions are not counted towards the maximum number of SRS symbols the UE supports per subframe.

In a twenty-second aspect, alone or in combination with one or more of the seventeenth through twenty-first aspects, the maximum number of SRS symbols the UE supports per subframe is only applicable if the UE is configured with at least one of the antenna switching or the frequency hopping.

In a twenty-third aspect, alone or in combination with one or more of the seventeenth through twenty-two aspects, the one or more parameters comprise: a number of transmit antennas and receive antennas the UE supports for transmitting multiple SRSs in the same subframe.

In a twenty-fourth aspect, alone or in combination with one or more of the seventeenth through twenty-third aspects, the UE reports support for a different number of transmit antennas and receive antennas for transmitting multiple SRS in the same subframe than for a single SRS in the same subframe.

In a twenty-fifth aspect, alone or in combination with one or more of the seventeenth through twenty-fourth aspects, the one or more parameters indicate support of intra-subframe frequency hopping depending on at least one of a band, band combination, band of band combination, SRS bandwidth, or configuration of gaps in the subframe.

In a twenty-sixth aspect, alone or in combination with one or more of the seventeenth through twenty-fifth aspects, the one or more parameters indicate at least one of: one or more bandwidth thresholds, for which the UE supports the intra-subframe frequency hopping with or without gaps; a first bandwidth threshold, wherein the UE does not support the intra-subframe frequency hopping if the SRS bandwidth is below the first bandwidth threshold; or a second bandwidth threshold, wherein the UE supports the intra-subframe frequency hopping if the SRS bandwidth is above the second bandwidth threshold.

In a twenty-seventh aspect, alone or in combination with one or more of the seventeenth through twenty-sixth aspects, wherein the network entity determines that: the UE supports the intra-subframe frequency hopping without the gaps if the SRS bandwidth is above the second bandwidth threshold; and the UE supports the intra-subframe frequency hopping with the gaps if the SRS bandwidth is between the first bandwidth threshold and the second bandwidth threshold.

In a twenty-eighth aspect, alone or in combination with one or more of the seventeenth through twenty-seventh aspects, the capability information to support the frequency hopping depends, at least in part, on a number of repetitions used for the SRSs transmissions.

In a twenty-ninth aspect, alone or in combination with one or more of the seventeenth through twenty-eighth aspects, the capability information indicates a number of symbols between frequency hops for the UE to support the frequency hopping without gaps.

In a thirtieth aspect, alone or in combination with one or more of the seventeenth through twenty-ninth aspects, the one or more parameters indicate, for each band in a band combination, whether the UE is to be configured with gaps to support intra-subframe antenna switching, wherein the capability information to support antenna switching depends, at least in part, on a number of repetitions used for the SRSs transmissions, and wherein the capability information indicates a number of symbols between antenna switches for the UE to support antenna switching without gaps.

In a thirty-first aspect, alone or in combination with one or more of the seventeenth through thirtieth aspects, when the UE performs frequency hopping and antenna switching in the same symbol, then a gap is configured if (when) the UE indicates it is to be configured with a gap to support either frequency hopping, antenna switching, or both.

In a thirty-two aspect, alone or in combination with one or more of the seventeenth through thirty-first aspects, the capability information also indicates whether the UE is able to support different types of SRS in the same subframe, and wherein, when the capability information indicates UE is able to support different types of SRS in the same subframe, the capability information also indicates at least one of: whether the UE is to be configured with a gap between SRS of different types due to at least one of frequency hopping, antenna switching, or power control; or whether there is a power restriction between power levels of the SRS of different types.

An apparatus for wireless communication, comprising at least one processor; and a memory coupled to the at least one processor, the memory comprising code executable by the at least one processor to cause the apparatus to perform the method of any of the first through thirty-two aspects.

An apparatus comprising means for performing the method of any of the first through thirty-two aspects.

A computer readable medium storing computer executable code thereon for wireless communications that, when executed by at least one processor, cause an apparatus to perform the method of any of the first through thirty-two aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, various operations shown in FIGS. 9 and 10 may be performed by various processors shown in FIG. 4. More particularly, operations 1000 of FIG. 10 may be performed by processors 420, 460, 438, and/or controller/processor 440 of the BS 110 shown in FIG. 4 while operations 900 of FIG. 9 may be performed by one or more of processors 466, 458, 464, and/or controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9 and FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
reporting, to a network entity, capability information indicating a capability of the UE to support multiple sounding reference signals (SRSs) in a same subframe, wherein the capability information comprises one or more parameters indicating capability of the UE to support at least one of frequency hopping, different bandwidths, or antenna switching for the multiple SRSs in the same subframe, and wherein the one or more parameters comprise a number of SRS symbols the UE supports per subframe; and
transmitting the SRSs in accordance with the capability information.

2. The method of claim 1, wherein at least one of the one or more parameters are reported per band, per band combination, or per band of band combination.

3. The method of claim 1, wherein the number of SRS symbols the UE supports per subframe is only applicable when the UE is configured with at least one of the antenna switching or the frequency hopping.

4. The method of claim 1, wherein the one or more parameters comprise:
a number of transmit antennas and receive antennas the UE supports for transmitting multiple SRSs in the same subframe.

5. The method of claim 4, wherein, the UE reports support for a different number of transmit antennas and receive antennas for transmitting multiple SRSs in the same subframe than for a single SRS in the same subframe.

6. The method of claim 1, wherein the one or more parameters indicate support of intra-subframe frequency hopping depending on at least one of a band, a band combination, a band of band combination, a SRS bandwidth, or a configuration of gaps in the subframe.

7. The method of claim 6, wherein the one or more parameters indicate at least one of:
one or more bandwidth thresholds, for which the UE supports the intra-subframe frequency hopping with or without gaps;
a first bandwidth threshold, wherein the UE does not support the intra-subframe frequency hopping when the SRS bandwidth is below the first bandwidth threshold; or
a second bandwidth threshold, wherein the UE supports the intra-subframe hopping when the SRS bandwidth is above the second bandwidth threshold.

8. The method of claim 7, wherein:
the UE supports the intra-subframe frequency hopping without the gaps when the SRS bandwidth is above the second bandwidth threshold; and
the UE supports the intra-subframe frequency hopping with the gaps when the SRS bandwidth is between the first bandwidth threshold and the second bandwidth threshold.

9. The method of claim 6, wherein the capability information to support the frequency hopping depends, at least in part, on a number of repetitions used for the SRS transmissions.

10. The method of claim 6, wherein the capability information indicates a number of symbols between frequency hops for the UE to support the frequency hopping without gaps.

11. The method of claim 1, wherein, when the UE is configured with gaps between SRS symbols, the gaps are not counted towards the number of SRS symbols the UE supports per subframe.

12. The method of claim 1, wherein, when repetition is used for transmitting the SRSs, repetitions are not counted towards the number of SRS symbols the UE supports per subframe.

13. The method of claim 1, wherein the one or more parameters indicate, for each band in a band combination, whether the UE is to be configured with gaps to support intra-subframe antenna switching, wherein the capability information to support antenna switching depends, at least in part, on a number of repetitions used for the SRSs transmissions, and wherein the capability information indicates a number of symbols between antenna switches for the UE to support the antenna switching without gaps.

14. The method of claim 1, wherein, when the UE performs frequency hopping and antenna switching in the same symbol, then a gap is configured when the UE indicates it is to be configured with a gap to support either frequency hopping, antenna switching, or both.

15. The method of claim 1, wherein the capability information also indicates whether the UE is able to support different types of SRS in the same subframe, and when the capability information indicates UE is able to support different types of SRS in the same subframe, the capability information also indicates at least one of:
whether the UE is to be configured with a gap between SRS of different types due to at least one of frequency hopping, antenna switching, or power control; or
whether there is a power restriction between power levels of the SRS of different types.

16. A method for wireless communications by a network entity, comprising:
receiving, from a user equipment (UE), capability information indicating a capability of the UE to support multiple sounding reference signals (SRSs) in a same subframe, wherein the capability information comprises one or more parameters indicating capability of the UE to support at least one of frequency hopping, different bandwidths, or antenna switching for the multiple SRSs in the same subframe, and wherein the one or more parameters comprise a number of SRS symbols the UE supports per subframe; and configuring the UE for transmitting the SRSs in accordance with the capability information.

17. The method of claim 16, wherein at least one of the one or more parameters are reported per band, per band combination, or per band of band combination.

18. The method of claim 16, wherein, when the UE is configured with gaps between SRS symbols, the gaps are not counted towards the number of SRS symbols the UE supports per subframe.

19. The method of claim 16, wherein, when repetition is used for transmitting the SRS, repetitions are not counted towards the number of SRS symbols the UE supports per subframe.

20. The method of claim 16, wherein the number of SRS symbols the UE supports per subframe is only applicable when the UE is configured with at least one of the antenna switching or the frequency hopping.

21. The method of claim 16, wherein the one or more parameters comprise:
a number of transmit antennas and receive antennas the UE supports for transmitting multiple SRSs in the same subframe.

22. The method of claim 21, wherein, the UE reports support for a different number of transmit antennas and receive antennas for transmitting multiple SRS in the same subframe than for a single SRS in the same subframe.

23. The method of claim 21, wherein the one or more parameters indicate support of intra-subframe frequency hopping depending on at least one of a band, band combination, band of band combination, SRS bandwidth, or configuration of gaps in the subframe.

24. The method of claim 23, wherein the one or more parameters indicate at least one of:
one or more bandwidth thresholds, for which the UE supports the intra-subframe frequency hopping with or without gaps;
a first bandwidth threshold, wherein the UE does not support the intra-subframe frequency hopping when the SRS bandwidth is below the first bandwidth threshold; or
a second bandwidth threshold, wherein the UE supports the intra-subframe frequency hopping when the SRS bandwidth is above the second bandwidth threshold.

25. The method of claim 24, wherein the network entity determines that:
the UE supports the intra-subframe frequency hopping without the gaps when the SRS bandwidth is above the second bandwidth threshold; and
the UE supports the intra-subframe frequency hopping with the gaps when the SRS bandwidth is between the first bandwidth threshold and the second bandwidth threshold.

26. The method of claim 23, wherein the capability information to support the frequency hopping depends, at least in part, on a number of repetitions used for the SRSs transmissions.

27. The method of claim 23, wherein the capability information indicates a number of symbols between frequency hops for the UE to support the frequency hopping without gaps.

28. The method of claim 16, wherein the one or more parameters indicate, for each band in a band combination, whether the UE is to be configured with gaps to support intra-subframe antenna switching, wherein the capability information to support antenna switching depends, at least in part, on a number of repetitions used for the SRSs transmissions, and wherein the capability information indicates a number of symbols between antenna switches for the UE to support antenna switching without gaps.

29. The method of claim 16, wherein, when the UE performs frequency hopping and antenna switching in the same symbol, then a gap is configured when the UE indicates it is to be configured with a gap to support either frequency hopping, antenna switching, or both.

30. The method of claim 16, wherein the capability information also indicates whether the UE is able to support different types of SRS in the same subframe, and wherein, when the capability information indicates UE is able to support different types of SRS in the same subframe, the capability information also indicates at least one of:
whether the UE is to be configured with a gap between SRS of different types due to at least one of frequency hopping, antenna switching, or power control; or
whether there is a power restriction between power levels of the SRS of different types.

31. An apparatus for wireless communications by a user equipment (UE), comprising:
a memory comprising computer-executable instructions; and
a processor configured to execute the computer-executable instructions and cause the UE to:
report, to a network entity, capability information indicating a capability of the UE to support multiple sounding reference signals (SRSs) in a same subframe, wherein the capability information includes one or more parameters indicating capability of the UE to support at least one of frequency hopping, different bandwidths, or antenna switching for the multiple SRSs in the same subframe, and wherein the one or more parameters comprise a number of SRS symbols the UE supports per subframe; and
transmit the SRSs in accordance with the capability information.

32. An apparatus for wireless communications by a network entity, comprising:
a memory comprising computer-executable instructions; and
a processor configured to execute the computer-executable instructions and cause the network entity to:
receive, from a user equipment (UE), capability information indicating a capability of the UE to support multiple sounding reference signals (SRSs) in a same subframe, wherein the capability information includes one or more parameters indicating capability of the UE to support at least one of frequency hopping, different bandwidths, or antenna switching for the multiple SRSs in the same subframe, and wherein the one or more parameters comprise a number of SRS symbols the UE supports per subframe; and configure the UE for transmitting the SRSs in accordance with the capability information.

* * * * *